(12) United States Patent
Kreppold

(10) Patent No.: US 6,469,642 B1
(45) Date of Patent: Oct. 22, 2002

(54) METHOD, SELECTOR SWITCH AND SELECTOR DEVICE FOR SECURELY SENSING A SELECTOR SWITCH POSITION

(75) Inventor: Bernhard Kreppold, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/438,393

(22) Filed: Nov. 12, 1999

(30) Foreign Application Priority Data

Nov. 12, 1998 (DE) .......................... 198 52 227

(51) Int. Cl.⁷ .............................................. H03K 17/94
(52) U.S. Cl. ........................ 341/20; 341/2; 341/8; 341/7; 307/10.1; 200/6 A
(58) Field of Search ...................... 341/20, 9, 15, 341/7, 2, 10, 13, 8; 307/10.1; 200/6 A

(56) References Cited

U.S. PATENT DOCUMENTS

| | | | | |
|---|---|---|---|---|
| 3,725,904 A | * | 4/1973 | Breslow ......................... | 341/7 |
| 4,472,780 A | * | 9/1984 | Chenoweth et al. ........ | 244/194 |
| 5,049,879 A | | 9/1991 | Symonds ................... | 307/10.1 |
| 5,215,048 A | | 6/1993 | Kaiser et al. .............. | 123/90.6 |
| 5,233,228 A | | 8/1993 | Krieg .......................... | 341/10 |
| 5,280,863 A | * | 1/1994 | Schmittle .................... | 244/46 |
| 5,444,613 A | * | 8/1995 | Tani et al. .................. | 318/640 |
| 5,493,497 A | * | 2/1996 | Buus .......................... | 244/194 |
| 5,531,402 A | * | 7/1996 | Dahl .......................... | 244/189 |
| 5,802,077 A | * | 9/1998 | Yeh ............................ | 370/242 |
| 5,850,403 A | * | 12/1998 | Lasne ......................... | 714/715 |
| 6,140,916 A | * | 10/2000 | Stollsteimer et al. ..... | 200/61.28 |
| 6,353,399 B1 | * | 3/2002 | Prakash et al. ............ | 341/10 |
| 6,376,929 B1 | * | 4/2002 | Nakajima ................... | 307/10.1 |

FOREIGN PATENT DOCUMENTS

| | | |
|---|---|---|
| DE | 3619956 | 12/1987 |
| DE | 3933021 | 4/1991 |
| DE | 4028442 | 3/1992 |
| DE | 4342430 | 1/1995 |
| DE | 19650249 | 6/1998 |
| EP | 0 612 088 | 8/1994 |

* cited by examiner

Primary Examiner—Michael Horabik
Assistant Examiner—Albert K. Wong
(74) Attorney, Agent, or Firm—Crowell & Moring LLP

(57) ABSTRACT

A method, a selector switch and selector device, is provided for secure position detection of a selector switch, which can be operated in at least two positions, particularly in a vehicle. In the method, a code word composed of a data part and a test part is assigned to each selector switch position. The code word is generated in each selector switch position by a number of switches corresponding to the number of bits of the code word. The data part already indicates an unambiguous selector switch position. In each code word, the test part is determined corresponding to a defined imaging rule from the data part. The test part generated by the switches is compared with the test part formed on the basis of the imaging rule from the data part, and, from a comparison of the two test parts, a conclusion is drawn with respect to a correct or erroneous position detection of the selector switch.

31 Claims, 4 Drawing Sheets

TABLE 1

| $p_2$ | $p_1$ | $p_0$ | $d_2$ | $d_1$ | $d_0$ |
|---|---|---|---|---|---|
| 0 | 0 | 0 | 0 | 0 | 0 |
| 0 | 1 | 1 | 0 | 0 | 1 |
| 1 | 0 | 1 | 0 | 1 | 0 |
| 1 | 1 | 0 | 0 | 1 | 1 |
| 1 | 1 | 0 | 1 | 0 | 0 |
| 1 | 0 | 1 | 1 | 0 | 1 |
| 0 | 1 | 1 | 1 | 1 | 0 |
| 0 | 0 | 0 | 1 | 1 | 1 |
| TEST WORD | | | DATA WORD | | |

TABLE 2
Syndrome Table:

| | | |
|---|---|---|
| F = 011 | ⇒ | $d_0$ ERRONEOUS |
| F = 101 | ⇒ | $d_1$ ERRONEOUS |
| F = 110 | ⇒ | $d_2$ ERRONEOUS |

TABLE 3

| Pges | $p_2$ | $p_1$ | $p_0$ | $d_2$ | $d_1$ | $d_0$ |
|---|---|---|---|---|---|---|
| 0 | 0 | 0 | 0 | 0 | 0 | 0 |
| 1 | 0 | 1 | 1 | 0 | 0 | 1 |
| 1 | 1 | 0 | 1 | 0 | 1 | 0 |
| 0 | 1 | 1 | 0 | 0 | 1 | 1 |
| 1 | 1 | 1 | 0 | 1 | 0 | 0 |
| 0 | 1 | 0 | 1 | 1 | 0 | 1 |
| 0 | 0 | 1 | 1 | 1 | 1 | 0 |
| 1 | 0 | 0 | 0 | 1 | 1 | 1 |
| Par. | TEST WORD | | | DATA WORD | | |

…

METHOD, SELECTOR SWITCH AND SELECTOR DEVICE FOR SECURELY SENSING A SELECTOR SWITCH POSITION

BACKGROUND AND SUMMARY OF THE INVENTION

This application claims the priority of German Application No. 198 52 227.4, filed Nov. 12, 1998, the disclosure of which is expressly incorporated by reference herein.

The invention relates to a method, a selector switch and a selector device, particularly in the case of a vehicle, for secure position detection of the selector switch, which can be operated in at least two positions.

A great number of selector switches are known in many fields of application. Their operation may trigger a mechanical, hydraulic, pneumatic or electric reaction. The present case relates to selector switches, which can be operated in at least two positions and emit an electric signal. The electrical signal is assigned to the respective position of the switch. The assignment (also known as coding) of the operating position to the corresponding reaction may be of an analog or digital nature. In the case of digital coding, a specific bit pattern, generated, for example, by the operation of switching elements, is assigned to each selector switch position.

Selector switches are known, in the case of which a specific electric switch, for example, an end position switch, is operated. The switch signal indicates the selector switch position to a control unit.

Within the wide range of application of selector switches, there are also those which supply particularly safety-relevant information. In the case of these selector switches, a special intrinsic safety and operability is particularly important. In the case of a motor vehicle, which has an electronically shiftable transmission, a transmission selector switch is but one example. Several switching positions must be recognized in a safe and reliable manner and must be transmitted to an electronic transmission control unit.

It is an object of the present invention to provide a method, a selector switch and a selector device, which permit secure position detection of a position taken up by the selector switch.

This object is achieved by a method for secure position detection, wherein a first switch position code composed of at least two bits is assigned to each selector switch position. The first switch position code is generated by a number of switches, which correspond to the number of bits of the code. A coding is used whereby the selector switch position assigned to a code is redundantly present in a code word as a second switch position code. A decoding algorithm is used which corresponds to the coding such that the redundant selector switch positions assigned to the code word are determined. From a comparison of the selector switch positions determined from the code word, a conclusion is drawn with respect to correct or erroneous position detection of the selector switch.

In another advantageous embodiment, the object is achieved by connecting the redundant coding via an imaging rule. By means of the imaging rule, the redundant selector switch position is determined from a detected selector switch position. From a comparison of the selecting position generated by means of the imaging rule and the detected redundant selecting position, a conclusion is drawn with respect to the correct or erroneous position detection of the selector switch.

The object is further achieved for a selector switch in a motor vehicle, wherein the selector switch positions are electrically detected by means of a defined number of switches. The switches supply information assigned to a respective selector switch position and combined to a respectively assigned code word. The code words redundantly contain the selector lever position as a second switch position code.

In a selecting device for achieving the object, a control device is provided. The selector switch supplies the code word to the control device. The control device is constructed to implement the method and, corresponding to the selector switch position reported by the selector switch and tested, the control device supplies a corresponding signal to a controllable unit.

The required intrinsic safety is basically achieved by using a redundant code, which therefore permits error recognition. A specific code word is bi-uniquely assigned to a selector switch position. By an evaluation of the redundant information in the code word, a conclusion can be drawn concerning an erroneous position detection.

Such methods are partially already known from other fields of application—for example, for ensuring correct data transmission. The degree of redundancy and thus the used codes depend on the intrinsic safety demands on the selector switch. On the whole, using a redundant digital code, a selector switch can advantageously be implemented having an arbitrarily high intrinsic safety.

It is also essential to the invention that valid code words, as the result of the coding rule, are imaged by a constructive conversion to a geometrical switch arrangement such that not only a bi-uniquely valid code word is assigned from the used coding space, but also that this code word at least twice additionally contains the selector switch position. By decoding the code word via a code-conforming algorithm, the redundancy contained in the code word becomes effective during the testing of the selector switch position.

The present invention is described with respect to two different embodiments. According to a first embodiment, the at least two selector switch positions are determined. The two positions are redundantly determined in the code word and are compared with one another. According to the second embodiment, the redundant selector switch position is theoretically determined from a selector switch position using a known imaging rule. The theoretical position is compared with the actually present second selector switch position.

A special embodiment is obtained by using the Hamming Code. However, the use of the Hamming Code is not meant to limit the scope of the invention.

According to an advantageous embodiment, a code word (composed of a data part (first switch position code) and a test part second switch position code)) is assigned to each selector switch position. Each code word in each selector switch position is generated by a number of switches corresponding to the number of bits of the code word, the data part already indicating an unambiguous selector switch position. The test part of each code word is obtained from a defined imaging rule from the data part. If then the test part actually generated by the switches is compared with the test part calculated from the data part according to the defined imaging rule, a conclusion can be drawn with respect to a correct or faulty position detection at the selector switch.

According to an expanded Hamming Code, an expanded test part can be provided in the case of the code word, the information of the test part resulting from a defined combination of the data and the test parts.

By means of the expanded Hamming Code, double fault recognition is possible. Although a double fault correction cannot be carried out, the vehicle driver can be informed of the presence of a corresponding fault and the corresponding precautionary measures can be taken.

By means of the normal Hamming Code, a single fault detection is possible. In this case, while the imaging rule is defined correspondingly (for example, an EXCLUSIVE-OR linking of the data part information), not only the existence of a single fault but also its position can be detected.

According to the selected Hamming distance ($d_{min}=3$; $d_{min}=4$), at every change of the switching position of the selector switch, a defined number of shifting operations take place. For this purpose, the code words must be selected correspondingly from the number of available possible code words (code word space). This effect can be utilized for determining asynchronous conditions during the shifting operation. When a Hamming distance of $d_{min}=4$ is selected, a new switching position can unambiguously be determined already after three bit changes. The approach may be that a code word will only be considered after three bit changes have taken place. For every position change, Boolean equations can be established and the changed bits can be compared with a Boolean operation table of the switching conditions. In the case of a corresponding conformity, a correct switch position was found. As a result of the last-mentioned measure, an error value of up to the fourth order can, in addition, be corrected. However, it is a disadvantage in this case that no localization of the defective signal paths is possible in the first step.

The two test parts (i.e., the detected test part and the calculated test part), are formed by way of an EXCLUSIVE-OR linkage—a so-called syndrome. In the event of detecting a single error, a stored syndrome table can supply information on the position of the error. Furthermore, when a code word with an expanded test part is used, while taking into account the expanded test part in the comparison of the tests parts, particularly of the syndrome, a stored table can rapidly and reliably indicate the presence of a double error.

The selector switch according to the present invention is constructed such that a number of switches generate the code word. The switches are assigned to the data parts or test parts (also an expanded test part). Care must be taken that the switches for the test parts are arranged and wired such that, at each selector switch position, the information of each test part is obtained in accordance with the defined imaging rule. Sliding contacts, Hall sensors or other switches can be used as the switches. The use of Hall sensors was found to be particularly advantageous. In this case, magnets for the Hall sensors assigned in each case to a specific switch can be arranged corresponding to a desired gear shifting gate and corresponding to an assignment of the code word information/selector switch position.

All Hall sensors assigned to the corresponding switches can be combined in a certain arrangement, opposite which a respective matching magnet array is situated. In this context, reference is made to the following embodiments.

A toggle switch, push button key or lever, or any other switch can be used as the selector switch.

In another advantageous embodiment according to the invention, a selecting device comprises a selector switch as well as a control device. The selector switch is constructed as discussed above. The control device is suitable for receiving and analyzing the transmitted code words and emits a signal to a unit to be controlled. This signal is reported by a selector. switch and is tested.

On the whole, the present invention provides the possibility of reliably detecting a selector switch position selected from several switching positions and determining and possibly eliminating errors—at least of a certain order. When selector switches are used on which particularly high demands are made concerning the intrinsic safety and reliability, the present invention meets these demands by implementing redundant systems.

Other objects, advantages and novel features of the present invention will become apparent from the following detailed description of the invention when considered in conjunction with the accompanying drawings.

Table 1 is a code table according to the normal Hamming Code.

Table 2 is a syndrome table; and

Table 3 is a code table according to the expanded Hamming code.

DETAILED DESCRIPTION OF THE DRAWINGS

Figure 4:
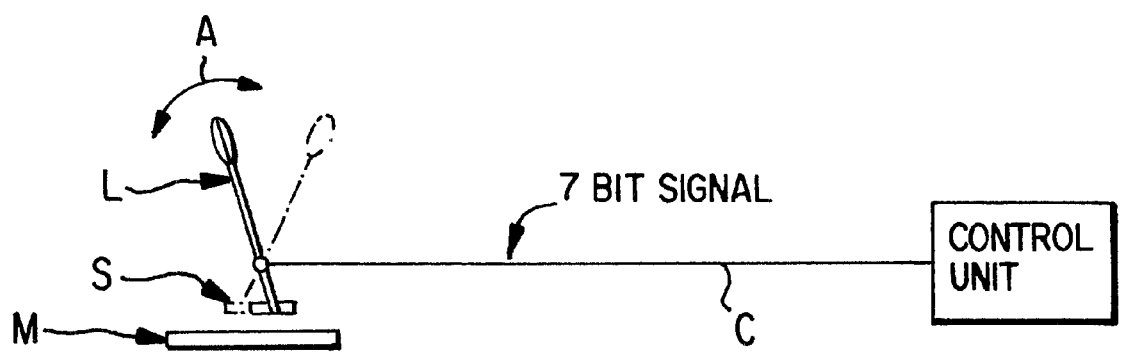
FIG. 4 is a schematic diagram of the selecting system according to the present invention.

Referring to FIG. 4, a selector lever L is schematically shown to be operatively coupled with a selector switch in the form of a magnetic array M with various magnetic elements and a sensor element S attached to one end of the pivotally arranged selector lever L. The movement of the selector lever L is shown with reference to the double arrow in connection with the switch positions according to FIG. 2a. Together with the selector lever L, the sensor element S which includes for example seven Hall sensors (as arranged per FIG. 2b) moves about the various magnetic elements of the magnetic array M and outputs a seven bit signal over signal line C to the control unit. The control unit checks the seven bit signal in accordance with the present invention as described herein.

In the two embodiments explained here, the method according to the invention is introduced on a cross-shaped (FIG. 1a) and a linear (FIG. 2a) shifting gate. In this case, the selector lever can be positioned in five switch positions respectively, a respective central switch position representing a neutral position into which the selector lever (constructed as a tip lever) is returned automatically after each operation.

Naturally, other shifting gate geometries and selector lever constructions, such as those with detent positions, are also contemplated within the scope of the invention.

A code word generated in each switch position by the selector lever is transmitted to a control device (FIG. 4) which is constructed for the processing of this code word according to the method described in the following and, in turn, triggers a unit to be controlled (such as a vehicle transmission) corresponding to the detected selector lever position.

In the case of the present method, a code word C is selected. The code word C is composed of three data bits $d_0$, $d_1$ and $d_2$ (a first switch position code), as well as three test bits $p_0$, $p_1$ and $p_2$ and an expanded text bit $p_G$ (a second switch position code).

The presently selected method is first demonstrated on a code word C without the expanded test bit $P_G$. The data bits $d_0$ to $d_2$ already unambiguously define a selector lever position. Each individual bit of the code word is generated by a respectively assigned switch of the selector lever.

Furthermore, an imaging (mapping) rule exists between the data bits and the test bits according to the following regulation:

$$\vec{P}\begin{pmatrix} P_0 \\ P_1 \\ P_2 \end{pmatrix},$$

with $$P_0 = D_0 \oplus D_1$$

$$P_1 = D_0 \oplus D_2$$

$$P_2 = D_1 \oplus D_2$$

The linking of the individual data parts ($\oplus$) takes place by way of an EXCLUSIVE-OR linkage.

Thus, a code table is obtained as illustrated in Table 1, eight selector lever positions being provided in this table. The code word generated by the switches of the selector lever is sent to the control device. The control device generates a test part (a decoded second switch position code) corresponding to the above-mentioned imaging rule, specifically according to the following regulation:

$$P'_0 = D_0 \oplus D_1$$

$$P'_1 = D_0 \oplus D_2$$

$$P'_2 = D_1 \oplus D_1$$

In the control device, the test part supplied by the selector lever from the switch positions and the test part calculated in the control unit are then compared with one another by way of an EXCLUSIVE-OR linkage. The syndrome F is determined as follows:

$$\vec{F} = \vec{P} \oplus \vec{P}'$$

While taking into account a combination of the data word and of the syndrome F determined in the control unit, error detection and correction can be implemented in a very simple manner. A differentiation must be made between the following cases:

1. If the syndrome F=0 and the data word transmitted by the selector lever corresponds to a valid bit combination, that is, a valid switch position, the sensed condition is free of errors.

2. However, if the syndrome is an element from the quantity (1, 0, 0) (0, 1, 0) or (0, 0, 1) and the data part is a valid data part, a single error exists in the test word. This sensing of the data part D and thus of the switch position can be assumed to be free of errors.

3. However, if the syndrome F is an element of the syndrome table indicated in Table 2, a single error is present in the data word D; that is, information (bits) transmitted in the data part is erroneous. By means of a comparison of the determined syndrome and the syndrome table, it can be determined whether the data bit $D_0$, $D_1$ or $D_2$ is erroneous.

The use of a code word with an expanded test part is advantageous. As a result, a Hamming distance of $d_{min}=4$ can be reached. Double error detection is therefore possible. In this case, a parity bit $P_{ges}$ is added to the code word:

$$P_{ges} = D_0 \oplus D_1 \oplus D_2 \oplus P_0 \oplus P_1 \oplus P_2$$

This results in a code table as illustrated in Table 3. By means of a separate evaluation of the test word and of the parity bit in the control device, a double error can be detected according to the following table.

| Number of Errors | Syndrome | Parity Control |
| --- | --- | --- |
| 0 | 000 | 0 |
| 1 | xxx | 1 |
| 2 | xxx ≠ 0 | 0 |

A double error is therefore characterized in that the syndrome F≠0, and the parity control for the entire code word is also 0. In this case, the code word is uncorrectable. The single error correction is blocked. A double error correction is not possible. In this case, the required measures must be taken and the vehicle user must be informed.

For solving the problem of asynchronous switching points in time, that is, in the case of an intermediate position of the switch between two unambiguous switching positions, it is helpful to select a Hamming distance of 4 ($d_{min}=4$) and to assign the code words to the corresponding switching positions such that, during each shifting operation, a change of four bits takes place. Already after three bit changes, the new switching position in clearly defined. On the whole, by means of this approach, an error value of 4 can be corrected. However, in the first step, no localization of the defective signal paths is possible. In addition, a valid signal condition must be used as the starting point.

If only two bits are triggered, exactly two signal paths of the changing bits are disturbed. This cannot be diagnosed directly. It could also be possible that the switch was not completely pressed down. This can be determined only by a linkage after several switching changes.

Figure 3:
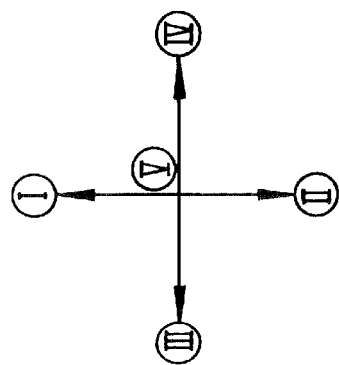
FIG. 3 is a view of a magnetic field array with a pertaining Hall sensor arrangement for the embodiment according to FIGS. 1 and 2.
Figure 1A:
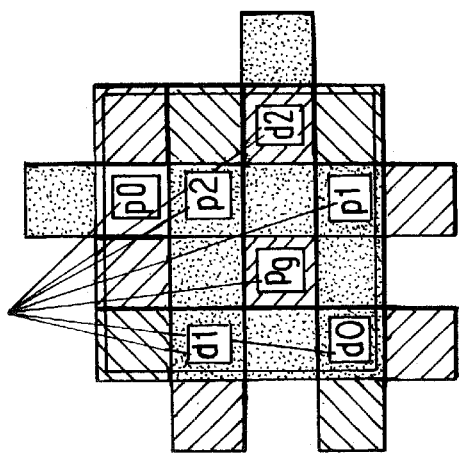
FIG. 1a is a simple drawing of five possible switch positions of a selector switch in the case of a cross-shaped shifting gate.
Figure 1B:
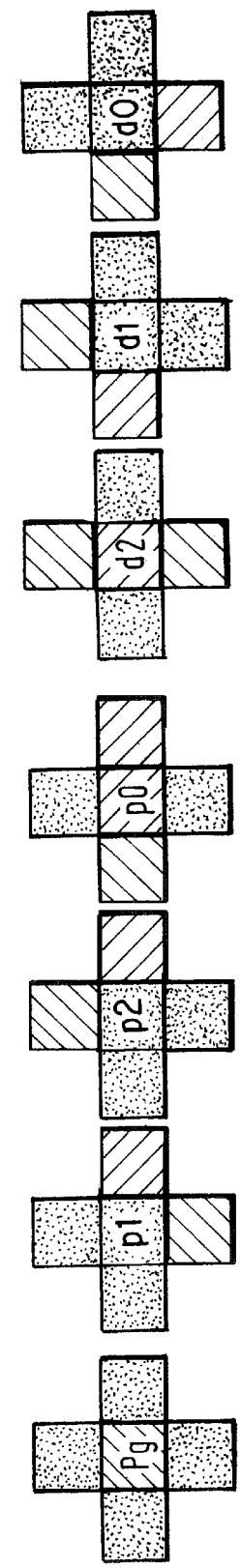
FIG. 1b is a view of an assigned magnet geometry for seven Hall sensors corresponding to one switch respectively.

FIGS. 1a, 1b and 3 show an embodiment of the geometry of the switches in the case of a cross-type shifting gate for a gear selecting lever which can be operated in five positions, specifically left, right, forward, backward and neutral (center position). Corresponding to this shifting gate and operating possibility of the selector lever, five code words are selected from the available code space. With a view to additional marginal conditions, such as the installation space, the selection of these code words takes place such that as many magnetic ranges of the individual bits as possible can logically intersect and therefore coincide. Presently, 7 Hall sensors $d_0$, $d_1$, $d_2$, $P_0$, $P_1$, $P_2$, $P_G$ are arranged, in which case, a cross-shaped magnet array with a defined magnet orientation (north-south) is defined, as illustrated in FIG. 1b, for each Hall sensor assigned to a switch. The Hall sensor positions $d_0$, $d_1$, $d_2$, $P_0$, $P_1$, $P_2$ and $P_G$ correspond to the respective data bits from Table 3. The south pole is in each case marked by cross-hatching and corresponds to a logical 0. The magnetic north pole is marked by dotting and corresponds to a logical 1, if it is arranged above the Hall sensor.

Since the present seven switches, thus the Hall sensors and the corresponding magnetic fields, must be implemented simultaneously, an arrangement of the Hall sensors $d_0$ to $d_2$, $P_0$ to $P_2$ and $P_G$ as illustrated in FIG. 3 is selected. The resulting total magnet array according to FIG. 3 corresponds to a surface-optimized superposition of the arrays illustrated in FIG. 1b and relates in each case to the respective Hall sensors. The magnet array can, for example, be arranged on the selector lever and, during a possible shifting operation corresponding to the shifting gate, overruns the Hall sensors. According to the shifting position, a coding is obtained. This coding is indicated in Table 3.

Figure 2B:
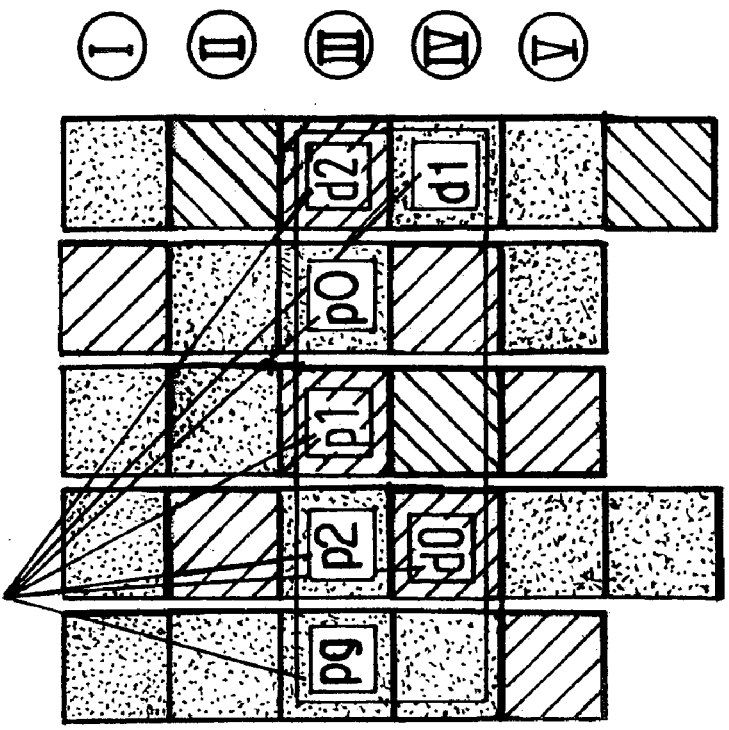
FIG. 2b is a view of the pertaining magnet geometry when Hall sensors for seven switches are used.
Figure 2A:
FIG. 2a is a simple drawing of five switch positions according to a linear shifting gate.

Analogously, FIGS. 2a and 2b show a magnet array and Hall sensors for a linear shifting gate with five switch positions. As a result of a corresponding movement, for example, the toggling of a toggle switch from the normal position (position III) into one of the other positions I, II, IV and V, an assigned code sequence can be generated according to the magnet array and the switch arrangement.

Naturally, other switches and shifting arrangements can also be used. In the present case, the shifting geometry for a gear selector lever was illustrated, which has five driving range positions (R, N, neutral, N and D).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for secure position detection of a selector switch in a vehicle, which is operable in at least two positions, the method comprising the acts of:
    assigning a first switch position code composed of at least two bits to each selector switch position;
    assigning a second switch position code that is a coded function of the first switch position code for each selector switch position;
    generating a code word by a number of switches corresponding to the number of bits of the code word, which code word comprises the first and second position code for each selector switch position;
    using a decoding algorithm, which corresponds to the coded function, to determine a decoded second switch position code; and
    drawing a conclusion with respect to a correct or erroneous position detection of the selector switch from a comparison of the code word and the decoded second position code.

2. Method for secure position detection of a selector switch in a vehicle, which is operable in at least two positions, the method comprising the acts of:
    assigning a code word composed of at least two bits to each selector switch position;
    generating the code word by a number of switches, which correspond to the number of bits of the code word, wherein the code word includes a first switch position code for the selector switch position and a coded function of the first switch position code, the coded function being an imaging rule;
    using the imaging rule, calculating the coded function of the first switch position code for the selector switch position from the code word; and
    drawing a conclusion with respect to a correct or erroneous position detection of the selector switch from a comparison of the code word and the calculated coded function of the first switch position code obtained using the imaging rule.

3. Method according to claim 2, wherein:
    each code word comprises a data part as the first switch position code and a test part as the coded function of the first switch position code, the data part already indicating an unambiguous selector switch position;
    for each code word, the test part is determined corresponding to the defined imaging rule from the data part;
    the test part generated by the switches is compared with the test part formed from the data part on the basis of the imaging rule; and
    from the comparison of the two test parts, a conclusion is drawn with respect to a correct or erroneous position detection of the selector switch.

4. Method according to claim 3, wherein for each code word, an expanded test part is provided whose information is obtained from a defined combination of the data and test parts.

5. Method according to claim 3, wherein the test part information is obtained by EXCLUSIVE-OR linkages of data part information.

6. Method according to claim 4, wherein the test part information is obtained by EXCLUSIVE-OR linkages of data part information.

7. Method according to claim 2, wherein the code words and the imaging rule for a test part as the first switch position code are formed such that a single error is detectable in the test or a data part as the coded function, is correctly assignable and is eliminatable.

8. Method according to claim 1, wherein the code words are assigned to the switching positions of the selector switch such that, in the case of each switching operation, a certain number of bits of the code word will change.

9. Method according to claim 2, wherein the code words are assigned to the switching positions of the selector switch such that, in the case of each switching operation, a certain number of bits of the code word will change.

10. Method according to claim 8, wherein 4 bits of the code word change.

11. Method according to claim 9, wherein 4 bits of the code word change.

12. Method according to claim 1, wherein the data part comprises 3 bits.

13. Method according to claim 2, wherein the first switch position code as a data part comprises 3 bits.

14. Method according to claim 1, wherein the second switch position code as a test part comprises 3 bits.

15. Method according to claim 2, wherein the coded function of the first switch position code forms a test part comprised of 3 bits.

16. Method according to claim 4, wherein the expanded test part comprises 1 bit.

17. Method according to claim 1, wherein, during the comparison of the detected and the calculated second switch position code as au test part, a syndrome (F) is formed as an EXCLUSIVE-OR linkage of both test parts.

18. Method according to claim 2, wherein, during the comparison of the detected and the calculated coded function of the first switch position code as a test part, a syndrome (F) is formed as an EXCLUSIVE-OR linkage of both test parts.

19. Method according to claim 7, wherein, in the event of a single error in the data part, a. syndrome table supplies information concerning the position of the error.

20. Method according to claim 4, wherein another table is stored by which, while taking into account the expanded test part and the comparison of the test parts, particularly taking into account the syndrome, information can be obtained concerning a single error or a double error.

21. A selector switch for a motor vehicle, comprising:
a defined number of switches, said defined number of switches electrically detecting selector switch positions of the selector switch; and
wherein said switches supply information assigned to a respective selector switch position and combined to a respectively assigned code word, the code word containing the selector switch position and a coded function of the selector switch position.

22. Selector switch according to claim 21, wherein each code word comprises a data part and a test part, the selector switch position being detectable already from the data part, and wherein the switches for the test part are set up such that, at each selector switch position, the test part is obtained corresponding to the coded function as a defined imaging rule from the data part.

23. Selector switch according to claim 21, wherein sliding contacts are used as the switches.

24. Selector switch according to claim 22, wherein sliding contacts are used as the switches.

25. Selector switch according to claim 21, wherein magnetic Hall sensors are used as the switches.

26. Selector switch according to claim 22, wherein magnetic Hall sensors are used as the switches.

27. Selector switch according to claim 21, wherein the switches are arranged such that, during a switching operation, the code word changes by a certain number of switch operations.

28. Selector switch according to claim 21, wherein for each switch, Hall sensor magnets are arranged corresponding to a desired shifting gate and corresponding to an assignment of the code word information/selector switch position.

29. Selector switch according to claim 28, wherein all of said Hall sensor magnets are arranged in a matching magnet array.

30. Selector switch according to claim 21, wherein the selector switch is one of a toggle switch, rocker switch, push button switch, and lever.

31. A selecting device for a vehicle, comprising:
a selector switch, in which selector switch positions are electrically detectable via a defined number of switches, said switches supplying information assigned to a respective selector switch position and combined to a respectively assigned code word, the code word containing the selector switch position and a coded function of the selector switch position;
a control device, said code word being supplied to the control device and, in accordance with a reported and tested selector switch position, supplying a corresponding signal to a unit to be controlled.

* * * * *